US010160075B2

(12) United States Patent
Nebuka

(10) Patent No.: US 10,160,075 B2
(45) Date of Patent: Dec. 25, 2018

(54) MAIN SPINDLE DEVICE FOR MACHINE TOOL AND MACHINE TOOL

(71) Applicant: MAKINO MILLING MACHINE CO., LTD., Tokyo (JP)

(72) Inventor: Teppei Nebuka, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 394 days.

(21) Appl. No.: 14/901,610

(22) PCT Filed: Jun. 28, 2013

(86) PCT No.: PCT/JP2013/067916
§ 371 (c)(1),
(2) Date: Dec. 28, 2015

(87) PCT Pub. No.: WO2014/207928
PCT Pub. Date: Dec. 31, 2014

(65) Prior Publication Data
US 2016/0207154 A1    Jul. 21, 2016

(51) Int. Cl.
*B23Q 1/26* (2006.01)
*B23Q 1/70* (2006.01)
*B23Q 11/00* (2006.01)

(52) U.S. Cl.
CPC .............. *B23Q 1/265* (2013.01); *B23Q 1/70* (2013.01); *B23Q 11/0032* (2013.01)

(58) Field of Classification Search
CPC ...... F16C 25/08; F16C 2322/39; F16C 27/04; F16C 33/66; F16C 35/12; B23Q 1/265; B23Q 1/26; B23Q 1/08; B23Q 1/70

USPC ......... 409/231, 233, 141; 408/143; 384/517; 173/162.2, 162.1
See application file for complete search history.

(56) References Cited

U.S. PATENT DOCUMENTS 4,668,108 A * 5/1987 McHugh ................. F16C 27/00
                                                384/215
6,238,152 B1 * 5/2001 Fujimoto .............. B23B 31/261
                                                408/239 A (Continued)

FOREIGN PATENT DOCUMENTS

EP    2 308 635    4/2011
JP    3-111103    5/1991

(Continued)

OTHER PUBLICATIONS

International Search Report dated Aug. 6, 2013, directed to International Application No. PCT/JP2013/067916, 2 pages.

*Primary Examiner* — Nathaniel Chukwurah
(74) *Attorney, Agent, or Firm* — Morrison & Foerster LLP

(57) ABSTRACT

The main spindle device for a machine tool is provided with: a bearing for rotatably supporting the main spindle; a bearing case for holding the bearing; a housing inside which the bearing case is disposed; and a stiffness-switching device, which supports the bearing case with respect to the housing and is able to switch the stiffness of the bearing case support between multiple levels. When the stiffness-switching device is supporting the bearing case at a low stiffness, the main spindle device is formed so that the bearing case slides with respect to the housing. A friction member is disposed on the area where the bearing case slides with respect to the housing.

6 Claims, 6 Drawing Sheets

(56) References Cited

U.S. PATENT DOCUMENTS

| | | | | |
|---|---|---|---|---|
| 6,505,972 B1* | 1/2003 | Harbottle | ............... | B23Q 1/70 384/517 |
| 2011/0020088 A1* | 1/2011 | Nakashima | ............ | F16C 19/54 409/231 |
| 2011/0023655 A1* | 2/2011 | Tatsuda | ............... | B23Q 16/107 74/822 |

FOREIGN PATENT DOCUMENTS

| | | |
|---|---|---|
| JP | 7-37811 | 4/1995 |
| JP | 9-269005 | 10/1997 |
| JP | 3076394 | 1/2001 |
| JP | 2011-20240 | 2/2011 |
| JP | 2011-79078 | 4/2011 |

* cited by examiner

MAIN SPINDLE DEVICE FOR MACHINE TOOL AND MACHINE TOOL

CROSS-REFERENCE TO RELATED APPLICATIONS

This application is a U.S. National Phase patent application of International Patent Application No. PCT/JP2013/067916, filed Jun. 28, 2013, which is hereby incorporated by reference in the present disclosure in its entirety.

FIELD OF THE INVENTION

The present invention relates to a spindle device of a machine tool, and the machine tool.

BACKGROUND ART

There has hitherto been known a machine tool which carries out processing such as cutting by moving a tool relative to a workpiece. The machine tool comprises a spindle device including a spindle to which the tool is fitted and a motor or the like for rotating the spindle. The spindle device is generally formed so that the tool can be replaced, and a plurality of processes can be carried out by tool replacement.

Patent Literature 1 discloses a peripheral velocity switching device which can change a preload of a bearing of the spindle, and switches a bearing set of the spindle according to a rotational speed of the spindle. As disclosed, this switching device applies a preload to a large bearing set disposed in front of the spindle during low-speed rotation. When a switch piston is moved by hydraulic pressure, the preload is applied to the large bearing set. On the other hand, during high-speed rotation, the large bearing set is in a state of no preload application. As disclosed, a tapered part is formed at an end of the switch piston, and a preload is absorbed when the preload of a pressure fluid is excessively large.

Patent Literature 2 discloses a spindle device which includes a diaphragm attached to an outer peripheral surface of a rear bearing case for supporting a spindle and an inner wall of a spindle head. The diaphragm supports the rear bearing case on an inner wall of a housing of the spindle head. As disclosed, the diaphragm supports the spindle while being elastically deformed in an axial direction but supports the spindle with high rigidity in a radial direction.

PATENT LITERATURE

Patent Literature 1: Japanese Utility Model Registration No. 3076394

Patent Literature 2: Japanese Examined Patent Publication (Kokoku) No. H07-37811

SUMMARY OF THE INVENTION

In general, processing accuracy of a machine tool can be improved by increasing the support rigidity for supporting a spindle. For example, when a workpiece is cut, the cutting can be carried out according to a desired amount. Alternatively, deeper cutting which increases the amount to be cut at once can be carried out. The spindle device is manufactured by setting the support rigidity so as to mainly satisfy the requirement of the deeper cutting. For example, the spindle device is designed to satisfy support rigidity required when a tool having a large diameter is fitted.

Depending on a type of tool, the tool may vibrate during processing. In other words, a reaction force applied to the tool which is currently processing a workpiece may cause the tool to vibrate. When the tool vibrates, processing accuracy of a processed surface of the workpiece is reduced, and processing efficiency is also reduced. In particular, when processing such as cutting is carried out by using a tool having a small diameter or a tool having a long length, vibration occurs more easily. For example, the processed surface may be finished by the tool having the small diameter. When the tool having the small diameter is fitted to the spindle device to carry out processing, rigidity of the tool is less than the support rigidity of the spindle of the spindle device, and thus the tool may vibrate. For example, chattering vibration may occur. As result, processing accuracy (processed surface quality) or processing efficiency is reduced in some cases, for example, chattering marks may be formed on the processed surface.

Thus, in general, it is necessary to increase the support rigidity of the spindle in order to improve the processing accuracy of the deeper cutting. However, when the support rigidity of the spindle is enlarged, damping performance of the vibration of the spindle is lowered. The vibration sometimes occurs when the tool has small diameter or the like. To suppress the vibration generated during the processing carried out by the tool having the small diameter, a damping function for damping the vibration may be provided to the tool. However, in this case, a special tool is required to be used, resulting in a normal tool that may not be used.

A spindle device of a machine tool according to the present invention comprises a spindle to which a tool is fitted, a bearing for rotatably supporting the spindle, a bearing case for holding the bearing, a housing in which the spindle, the bearing, and the bearing case are arranged, a rigidity switching device supporting the bearing case on the housing and capable of switching support rigidity for supporting the bearing case at a plurality of stages of rigidity including low rigidity and high rigidity higher than the low rigidity, and a vibration damping device disposed between the housing and the bearing case and actuated when the rigidity switching device supports the bearing case with the low rigidity.

According to the invention described above, the vibration damping device can include a friction member disposed in a contact part of the housing and the bearing case.

According to the invention described above, the rigidity switching device can be formed to move the bearing case along a rotational axis of the spindle in the housing, the bearing case includes a tapered part in which a diameter of an outer surface is gradually reduced, and the rigidity switching device can support the bearing case with the high rigidity by moving the bearing case to press the tapered part to the housing, and support the bearing case with the low rigidity by providing the tapered part with a gap.

According to the invention described above, the spindle device can further comprise a plate-like member supporting the bearing case on the housing and having a thickness direction set nearly parallel to the rotational axis of the spindle, and the bearing case can have an end of a side on which the tool is disposed and which is supported by the rigidity switching device, and an end of a side opposite to the side on which the tool is disposed and which is supported by the plate-like member.

According to the invention described above, the spindle device can further comprise a displacement sensor for detecting displacement of the spindle with respect to the housing.

According to the invention described above, the rigidity switching device normally supports the bearing case with the high rigidity, and can be switched to support the bearing case with the low rigidity when a predesignated tool is fitted to the spindle.

According to the invention described above, the rigidity switching device can support the bearing case with the low rigidity when a diameter of the tool fitted to the spindle is smaller than a preset value, and support the bearing case with the high rigidity when the diameter of the tool fitted to the spindle is equal to or larger than the preset value.

A machine tool according to the present invention comprises the aforementioned spindle device, and when the rigidity switching device switches the support rigidity of the bearing case to the low rigidity, a tool length offset value of a NC device is rewritten only by a value equivalent to a moving amount of the bearing case along the rotational axis of the spindle.

The present invention can provide a spindle device of a machine tool which can prevent vibration of a small-diameter tool or the like and improve processing accuracy (processed surface quality) for a workpiece and processing efficiency, and the machine tool.

DETAILED DESCRIPTION OF THE INVENTION

Referring to FIGS. 1 to 7, a spindle device of a machine tool according to an embodiment of the present invention will be described. The spindle device which rotates a spindle having a tool fitted thereto can be disposed in any machine tool. For example, the spindle device can be disposed in a machine tool such as a horizontal or vertical machining center, a milling machine, or a boring machine.

Figure 1:
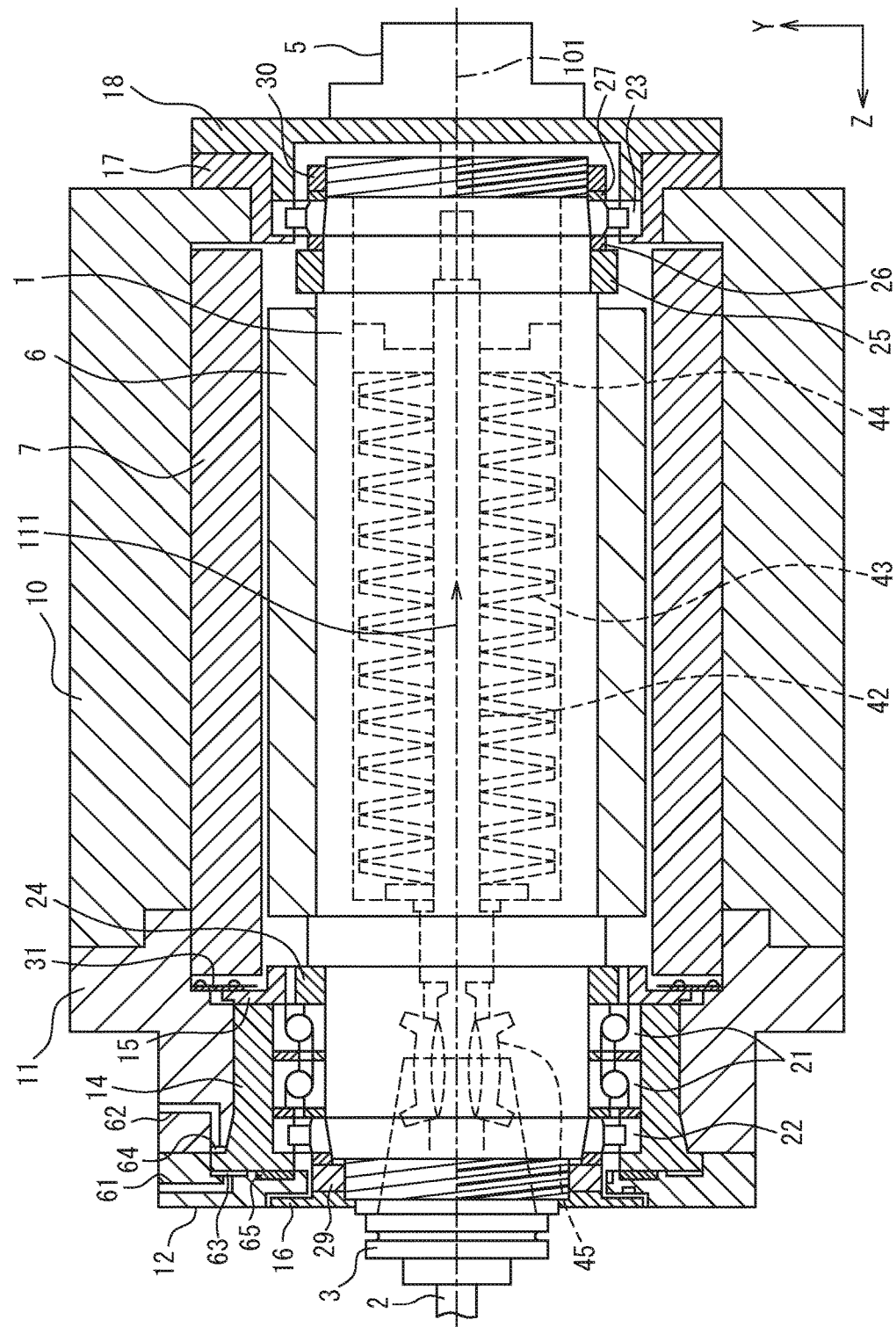
FIG. 1 is a schematic partial sectional view of a spindle device according to an embodiment.

FIG. 1 is a schematic partial sectional view of the spindle device according to the embodiment. The spindle device includes a spindle 1 for supporting a tool 2, and a housing in which the spindle 1 is disposed. The housing according to the embodiment includes a spindle head housing 10, a front housing 11, and a front end housing 12.

The spindle device according to the embodiment includes a built-in type rotary machine. A stator 7 is disposed on an inner surface of the spindle head housing 10. A rotor 6 is disposed on an outer surface of the spindle 1. The stator 7 and the rotor 6 constitute the rotary machine. The spindle 1 is formed into a cylindrical shape, and rotated in the spindle head housing 10.

In the embodiment, in an extending direction of a rotational axis 101 of the spindle 1, a side on which the tool 2 is fixed is referred to as a front side, and a side which is opposite to the fixed side of the tool 2 is referred to as a rear side. The extending direction of the rotational axis 101 of the spindle 1 is referred to as a Z-axis direction. An end of the front side of the spindle 1 is supported by the front housing 11 via a bearing, namely a front bearing, and bearing cases 14 and 15 for holding the front bearing.

The front bearing supports the spindle 1 which is rotatable around the rotational axis 101. The front bearing according to the embodiment includes a pair of angular bearings 21 arranged back to back, and a roller bearing 22. The roller bearing 22 according to the embodiment includes a cylindrical roller. The angular bearing 21 provides, even when a force is applied to the spindle 1 in the extending direction of the rotational axis 101, a force to counter this force. The angular bearing 21 has a function of suppressing movement of the spindle 1 in the extending direction of the rotational axis 101.

The bearing cases 14 and 15 are formed to cover the angular bearings 21 and the roller bearing 22. The bearing case 14 is disposed between the front bearing and the front housing 11. The bearing case 14 and the bearing case 15 according to the embodiment are fixed to each other. The bearing case 14 and the bearing case 15 are formed by separate members. However, it is not limited to the above-described embodiment, and the bearing case 14 and the bearing case 15 may be integrally formed by one member. The front bearing and the bearing cases 14 and 15 are arranged in the housing.

An end of the rear side of the spindle 1 is supported by the spindle head housing 10 via a rear bearing and a bearing case 17 supporting the rear bearing. The rear bearing supports the spindle 1 to be rotatable around the rotational axis 101. The rear bearing according to the embodiment includes a roller bearing 23. The roller bearing 23 according to the embodiment includes a cylindrical roller. An outer ring of the roller bearing 23 is pressed toward the bearing case 17 via a bearing pressing member 18. This roller bearing 23 is supported by the spindle head housing 10 via the bearing case 17.

A nut 30 is fixed to the end of the rear side of the spindle 1. By fastening the nut 30, an inner ring of the roller bearing 23 is fixed to the spindle 1 via a sleeve 25 and collars 26 and 27. In addition, by fastening the nut 30, the inner ring of the roller bearing 23 bites into a tapered part of the spindle 1 to apply a preload to the roller bearing 23.

In the spindle 1, a draw bar 42 is disposed to extend along the rotational axis 101. The draw bar 42 is formed into a bar shape. A disc spring 43 is disposed around the draw bar 42. A nut 44 is disposed at an end of a rear side of the disc spring 43. The nut 44 is fixed to the draw bar 42.

The spindle 1 includes a collet 45 engaged with the draw bar 42. The draw bar 42 is urged to a rear side indicated by an arrow 111 by the disc spring 43 to be engaged with the collet 45. At this time, the collet 45 is set in a state where an end of a front side is open. The collet 45 is engaged with a tool holder 3 to hold the tool holder 3. On the other hand, the collet 45 is formed to be disengaged from the tool holder 3 when the draw bar 42 is pressed toward the front side.

The spindle device includes a hydraulic cylinder 5 for pressing the draw bar 42 to the front side. When the hydraulic cylinder 5 is driven to press the draw bar 42, fixing of the tool holder 3 is released. The tool 2 is fixed to the tool holder 3. The tool 2 can be replaced together with the tool holder 3.

When a workpiece is processed, the pressing of the draw bar 42 by the hydraulic cylinder 5 is released. The tool holder 3 is fixed by an urging force of the disc spring 43 to a tapered hole of the front side of the spindle 1. Thus, during the processing of the workpiece, a state where the tool 2 is fixed to the spindle 1 is set. The tool 2 rotates or moves integrally with the spindle 1.

Figure 2:
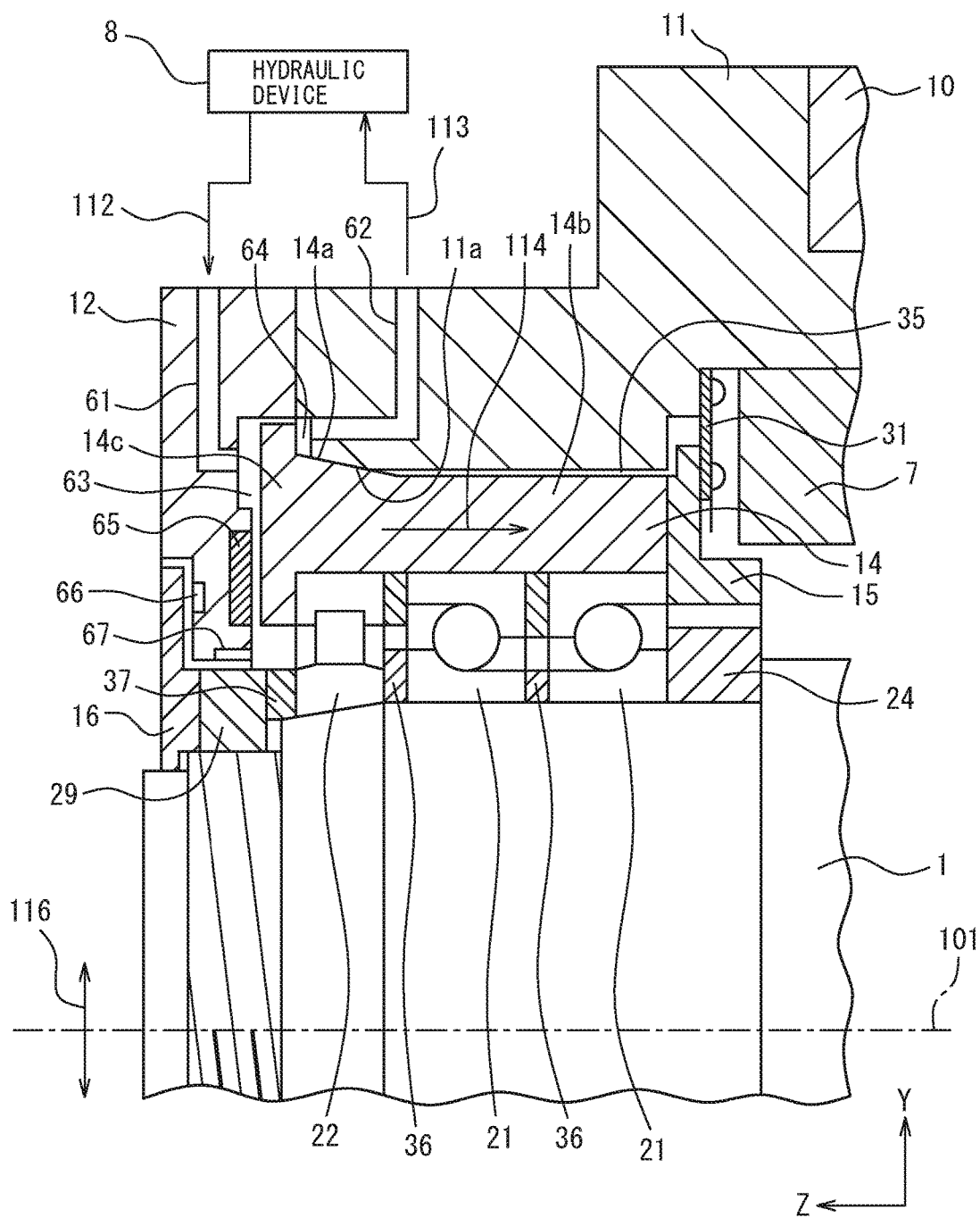
FIG. 2 is a schematic enlarged sectional view of a bearing case portion of the spindle device according to the embodiment.

FIG. 2 is a schematic enlarged sectional view of the front bearing and the bearing case portion. Referring to FIGS. 1 and 2, the outer rings of the angular bearing 21 and the roller bearing 22 are supported by the bearing cases 14 and 15. A collar 36 is disposed between the angular bearing 21 and the roller bearing 22.

The bearing case 14 includes a cylindrical part 14b formed to be nearly constant in thickness along the rotational axis 101. In the embodiment, a gap part 35 having a slight gap between a surface of an outer side of the cylindrical part 14b and an inner surface of the front housing 11 is formed. Height of the gap part 35 is preferably, for example, about several tens of μm in a diameter direction of the spindle 1. In other words, the surface of the outer side of the cylindrical part 14b and the inner surface of the front housing 11 are preferably separated from each other by several tens of μm.

The bearing case 14 includes a piston part 14c at the end of the front side. The bearing case 14 includes a tapered part 14a formed between the piston part 14c and the cylindrical part 14b. The tapered part 14a has its outer diameter gradually reduced toward the rear side. The front housing 11 includes a tapered hole part 11a formed in a portion facing the tapered part 14a. The tapered hole part 11a has its inner diameter gradually reduced toward the rear side. The tapered hole part 11a according to the embodiment is formed to come into surface-contact with the tapered part 14a when the tapered part 14a is pressed, and simultaneously the piston part 14c comes into surface-contact with the front end of the front housing 11. Thus, the bearing case 14 is bound two sides.

The ends of the rear sides of the bearing cases 14 and 15 are supported by a diaphragm 31. The diaphragm 31 is a plate-like member formed into a plate shape by a metal. The diaphragm 31 has its thickness direction which is set nearly parallel to a direction of the rotational axis 101 of the spindle 1. The diaphragm 31 has its end of an outer side in a diameter direction fixed to the front housing 11, and its end of an inner side in the diameter direction fixed to the bearing case 15.

A nut 29 is disposed in front of the roller bearing 22 via a collar 37. A sleeve 24 is disposed behind the angular bearing 21. By fastening the nut 29 to the spindle 1, the roller bearing 22 is pressed via the collar 37. An inner ring of the roller bearing 22 bites into the tapered part of the spindle 1 to apply a preload to the roller bearing 22. Further, by fastening the nut 29, an inner ring of the angular bearing 21 of the front side is pressed to the rear side via the collar 36. This pressing force is transmitted to an outer ring of the angular bearing 21 of the front side, an outer ring of the angular bearing 21 of the rear side, and an inner ring of the angular bearing 21 of the rear side in this order. Accordingly, a preload is also applied to the angular bearing 21.

A seal member 16 is disposed in front of the nut 29. The seal member 16 suppresses flowing-out of lubricating oil supplied to the front bearing, and prevents entry of chips into the spindle device. The seal member 16 constitutes, for example, a labyrinth seal having concave and convex patterns formed on its surface.

The spindle device according to the embodiment includes a moving device for moving the bearing cases 14 and 15 in the direction of the rotational axis 101 of the spindle 1 in the housing. An oil chamber 63 is formed in front of the piston part 14c of the bearing case 14. An oil path 61 is formed in the front end housing 12. The oil path 61 communicates with the oil chamber 63. Eight equally distributed oil chambers 64 are formed on a front end surface of the front housing 11 of the rear side of the piston part 14c. An oil path 62 is formed in the front housing 11. The oil path 62 communicates with the oil chamber 64.

The moving device according to the embodiment includes a hydraulic device 8 for supplying high-pressure control oil to the oil chambers 63 and 64. By supplying the high-pressure control oil to one of the oil chambers 63 and 64 from the hydraulic device 8, the piston part 14c can be moved along the extending direction of the rotational axis 101. In other words, the moving device can move the bearing cases 14 and 15 along the direction of the rotational axis 101 of the spindle 1.

The spindle device according to the embodiment includes a vibration damping device for accelerating damping of vibrations generated in the bearing case 14 and the spindle 1. The vibration damping device is provided between the housing and the bearing case 14. The vibration damping device according to the embodiment includes a friction member 65 fixed to the front end housing 12. The friction member 65 is provided in a contact part of the housing and the bearing case 14. The friction member 65 is disposed to face an end surface of the front side of the bearing case 14. The friction member 65 according to the embodiment is formed into a plate shape. The friction member 65 has its thickness direction set nearly parallel to the direction of the rotational axis 101.

The spindle device according to the embodiment includes a rigidity switching device capable of switching, at a plurality of stages, support rigidity for supporting the bearing cases 14 and 15 on the housing. The rigidity switching device according to the embodiment supports the bearing cases 14 and 15, at two stages, low rigidity and high rigidity higher than the low rigidity. The rigidity switching device includes a moving device, and switches rigidity by moving the bearing cases 14 and 15.

In the state illustrated in FIG. 2, the spindle 1 is supported with high rigidity. The hydraulic device 8 supplies high-pressure control oil to the oil chamber 63 as indicated by an arrow 112. From the oil chamber 64, the stored control oil flows out as indicated by an arrow 113. The piston part 14c of the bearing case 14 is pressed by hydraulic pressure of the control oil supplied to the oil chamber 63. The bearing cases 14 and 15 are pressed to the rear side as indicated by an arrow 114.

The tapered part 14a of the bearing case 14 closely contacts to the tapered hole part 11a of the front housing 11 and, simultaneously, the rear side of the piston part 14c of the bearing case 14 closely contacts to the front end surface of the front housing 11. Accordingly, the ends of the front sides of the bearing cases 14 and 15 are bound in a diameter direction indicated by an arrow 116 and an axial direction indicated by the arrow 114. The ends of the rear sides of the bearing cases 14 and 15 are bound by the diaphragm 31 in the diameter direction. The spindle 1 has the ends of the front sides bound in the diameter direction and in the axial direction in addition to the ends of the rear sides of the bearing cases 14 and 15, and thus the bearing cases 14 and 15 can be supported on the housing with high rigidity.

Figure 3:
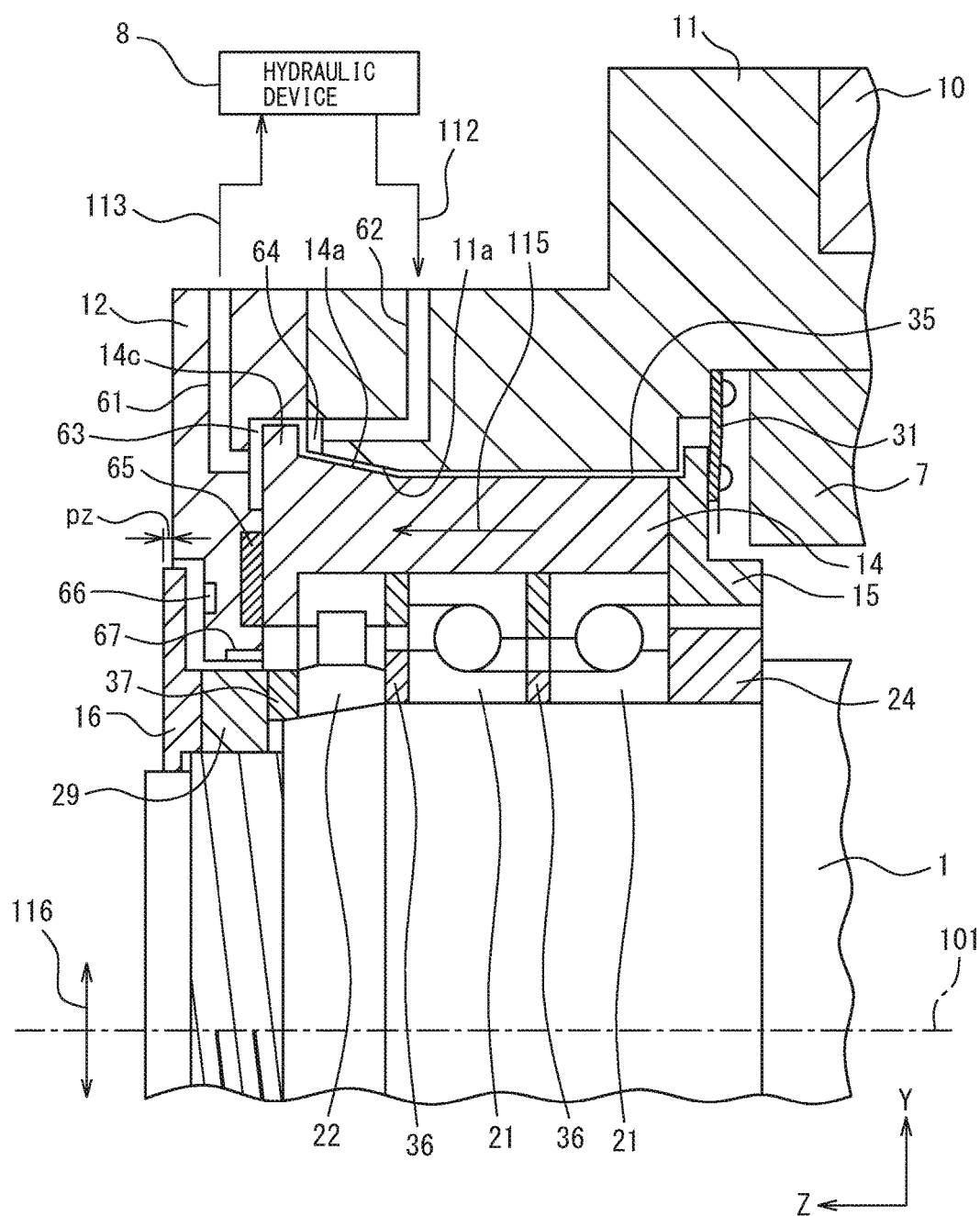
FIG. 3 is another schematic enlarged sectional view of the bearing case portion of the spindle device according to the embodiment.

FIG. 3 is another schematic enlarged sectional view of the portions of the front bearing and the bearing case of the spindle device according to the embodiment. In a state illustrated in FIG. 3, the spindle 1 is supported with low rigidity. The hydraulic device 8 supplies high-pressure control oil to the oil chamber 64 as indicated by an arrow 112. The control oil stored in the oil chamber 63 flows out as indicated by an arrow 113. As a result, the bearing cases 14 and 15 move along the rotational axis 101 in a direction indicated by an arrow 115. In other words, the bearing cases 14 and 15 move to the front side. The tapered part 14a of the bearing case 14 moves away from the tapered hole part 11a of the front housing 11. Moving amounts of the bearing cases 14 and 15 in this case are preferably small, about several hundreds of μm. The front end surface of the piston part 14c of the bearing case 14 comes into contact with the friction member 65. By the movement of the bearing case 14 to the front side, slight gaps are formed between the tapered part 14a and the tapered hole part 11a and between the piston part 14c and the front surface of the front housing 11. The gap between the tapered part 14a and the tapered hole part 11a is, for example, several tens of μm.

The bearing cases 14 and 15 support the angular bearing 21 and the roller bearing 22, and the angular bearing 21 and the roller bearing 22 support the spindle 1. Accordingly, the movements of the bearing cases 14 and 15 cause the movement of the spindle 1 in the direction indicated by the arrow 115. The seal member 16 protrudes from a surface of the front end housing 12. This moving amount pz of the spindle 1 is, for example, about several hundreds of μm as described above.

When the bearing cases 14 and 15 move to the front side, the diaphragm 31 is slightly deformed. The ends of the rear sides of the bearing cases 14 and 15 are bound by the diaphragm 31 in the diameter direction. However, the end of the front side of the bearing case 14 is set in a state of not receiving strong binding. Thus, the bearing cases 14 and 15 can be supported on the housing with low rigidity. In other words, the spindle 1 can be supported on the housing with low rigidity.

Therefore, by moving the bearing cases 14 and 15, the support rigidity of the spindle 1 can be changed. In the rear bearing for supporting the end of the rear side of the spindle 1, referring to FIG. 1, the inner ring slides with respect to the roller of the roller bearing 23 to move the spindle 1.

A normal state of the spindle device according to the embodiment is the state of the high rigidity illustrated in FIG. 2, and employed for many processing operations. In particular, since the spindle 1 is supported with the high support rigidity, the state illustrated in FIG. 2 is suitable when the tool 2 of the large diameter is used, when deeper cutting having a large cutting-in amount is carried out, or the like. The high support rigidity can be achieved by pressing the tapered part 14a and the piston part 14c of the bearing case 14 into contact with the front housing 11. As a result, processing can be carried out with high accuracy.

On the other hand, when processing such as cutting is carried out by using the tool 2 of the small diameter, contact between the tool 2 and a processed surface may generate vibration in the tool 2. In such a case, the spindle device is set in the state of low rigidity illustrated in FIG. 3. In this state, the ends of the rear sides of the bearing cases 14 and 15 are strongly bound by the diaphragm 31 in the diameter direction. However, the ends of the front sides of the bearing cases 14 and 15 can vibrate with slight amplitude in the diameter direction indicated by the arrow 116 since the ends are not bound strongly.

Small vibration generated in the tool 2 during the processing is transmitted to the spindle 1. The small vibration of the spindle 1 causes sliding of the end surface of the piston part 14c of the bearing case 14 with the friction member 65. Accordingly, the vibration of the spindle 1 can be damped by friction. As a result, the vibration generated in the tool 2 is suppressed to enable processing with high accuracy. In particular, when the tool 2 of the small diameter is used, the processing can be carried out while suppressing chattering vibration. This processing is suitable when finish processing is carried out by using the tool 2 of the small diameter or the like. Thus, the vibration damping device according to the embodiment is actuated when the rigidity switching device supports the bearing case 14 with low rigidity.

The fiction member 65 for suppressing the vibration of the spindle 1 preferably employs a member which smoothly slides with the bearing case 14 even with micro vibration. For example, the friction member 65 is preferably made of a material having a small difference between a static friction coefficient and a dynamic friction coefficient. Alternatively, the friction member 65 is preferably a low friction sliding member.

The friction member 65 according to the embodiment is made of a fluorine resin. The fluorine resin is a material having a static friction coefficient set larger by about 1.0 to 1.1 times than a dynamic friction coefficient. Accordingly, even with vibration of very small amplitude, the friction member 65 and the bearing case 14 smoothly slide with each other. Vibration energy can be effectively converted into thermal energy. Even when chattering vibration occurs, the vibration can be effectively damped by friction. Further, in the spindle device according to the embodiment, the oil chamber 63 is formed in front of the piston part 14c. Accordingly, the control oil also moves to a surface of the friction member 65, and a viscous damping effect of the control oil can be provided.

The fiction member 65 according to the embodiment is fixed to the front end housing 12. However, it is not limited to the above-described embodiment, and the friction member 65 can be disposed in a portion where the bearing case slides with respect to the housing. For example, the fiction member may be disposed in the bearing case.

The diaphragm 31 is preferably formed so that rigidity in the diameter direction can be sufficiently large. In addition, preferably, an elastic force of the diaphragm 31 in the extending direction of the rotational axis 101 is appropriately large. Such a diaphragm 31 can be made of metal.

Figure 4:
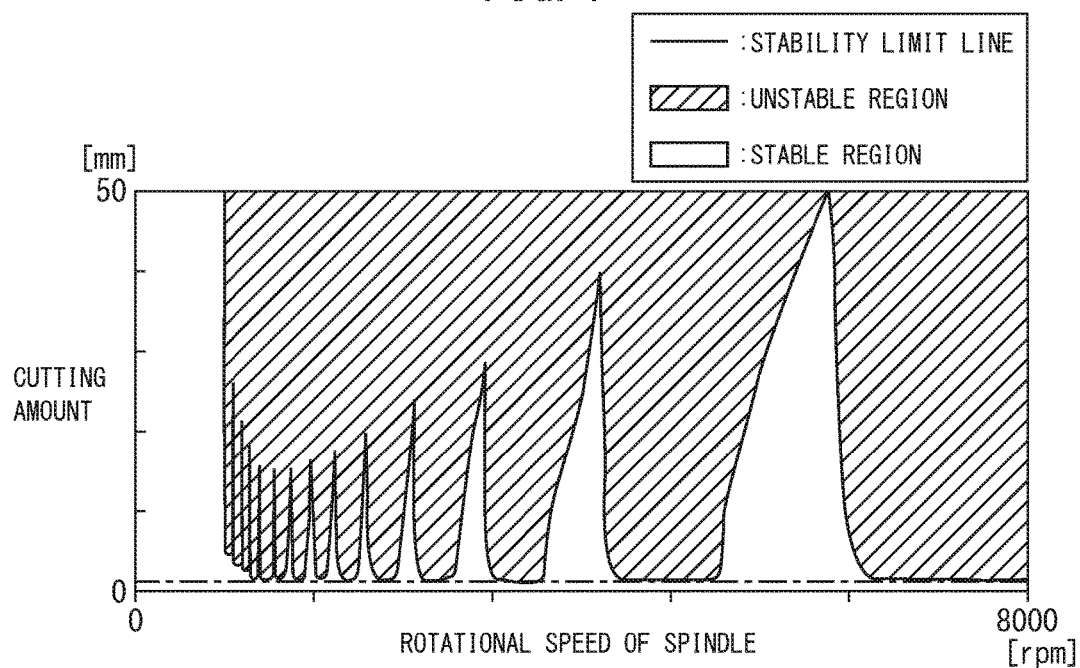
FIG. 4 is a diagram of a stability limit line of a spindle device according to comparative example.
Figure 5:
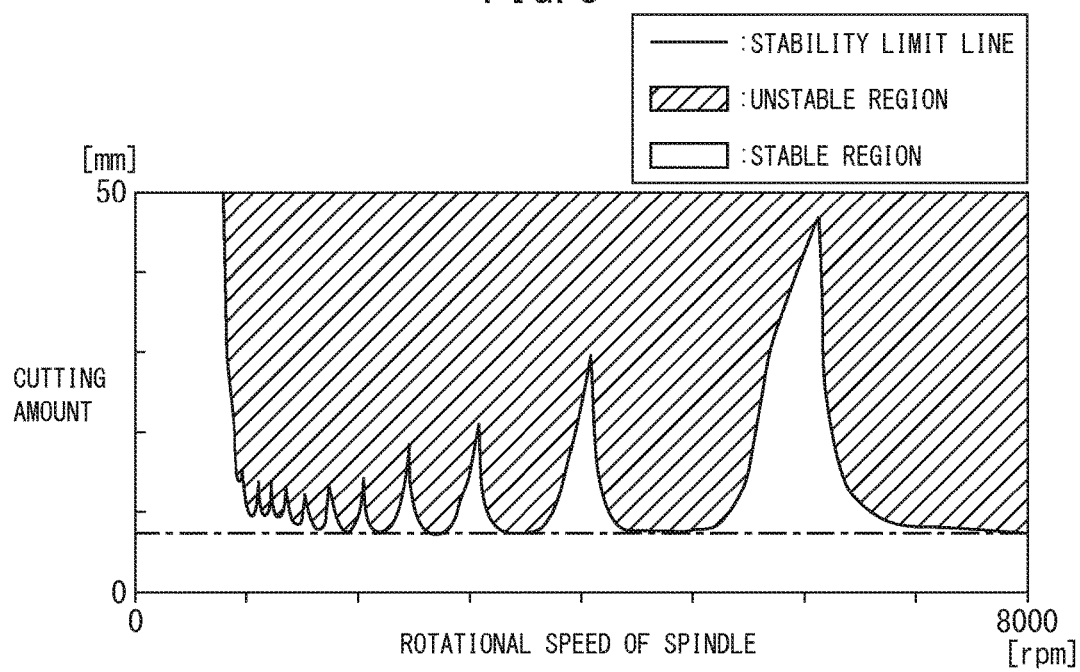
FIG. 5 is a diagram of a stability limit line of the spindle device according to the embodiment.

FIG. 4 is a diagram illustrating a stability limit line when a tool of a small diameter is fitted to a spindle device according to comparative example to carry out processing simulation. The spindle device according to comparative example does not include the rigidity switching device of the embodiment, but always supports a spindle with high support rigidity. FIG. 5 is a diagram illustrating a stability limit line when a tool of a small diameter is fitted to the spindle device according to the embodiment to carry out processing simulation. FIG. 5 illustrates a state where the rigidity switching device supports the spindle with low support rigidity. A horizontal axis indicates a rotational speed of the spindle, while a vertical axis indicates a cutting-in amount of the tool. A result when an end mill of a small diameter is used as the tool is illustrated.

It can be understood from FIG. 4 that when the tool of the small diameter is used in the state of supporting the spindle with the high rigidity, chattering vibration occurs, and a cutting-in amount indicating a lower limit of the stability limit line is very small. On the other hand, it can be understood from FIG. 5 that by supporting the spindle with low rigidity and using the friction member to reduce vibration via friction damping, a cutting-in amount indicating a lower limit of the stability limit line is larger than that of the comparative example.

In the spindle device according to the embodiment, even in a state where tool vibration easily occurs, a cutting-in amount can be increased, and stable processing can be carried out. In other words, the spindle device according to the embodiment can improve processing accuracy (processed surface quality) and processing performance. A reason for this may be that the reduction of the support rigidity of the spindle enables vibration of the spindle in the same vibration mode as that of the tool vibration, and the sliding of the friction member enables damping of the vibration. Thus, the spindle device according to the embodiment can suppress vibration generated in the tool itself. In particular, vibration generated when a tool having a small diameter, a tool having a long tool-length, a tool in which vibration easily occurs, or the like is used can be effectively damped. In addition, by switching the support rigidity to the high rigidity, even when the tool of the large diameter is used or the like, processing can be carried out with high processing accuracy and processing performance.

An example of the tool may be a tool which carries out processing while rotating, specifically an end mill. An example of a tool diameter in which vibration such as chattering vibration occurs is 10 mm or less. For example, when an end mill having a tool diameter of 10 mm or less is used, the spindle 1 is preferably supported with low support rigidity. When an end mill having a tool diameter larger than 10 mm is used, the spindle 1 is preferably supported with high support rigidity.

Referring to FIGS. 2 and 3, a gap is formed between the seal member 16 and the front end housing 12. In a region where this gap is formed, a displacement sensor 66 is disposed in the front end housing 12. The displacement sensor 66 detects displacement of the spindle 1 with respect to the housing in a Z-axis direction. A gap is formed between the front end housing 12 and the nut 29. In a region where this gap is formed, a displacement sensor 67 is disposed in the front end housing 12. The displacement sensor 67 detects displacement of the spindle 1 with respect to the housing in a Y-axis direction.

Further, in an X-axis direction (direction vertical to paper surface) orthogonal to the Y axis and the Z axis, a displacement sensor for detecting displacement of the spindle 1 with respect to the housing is disposed. The displacement sensor for the X-axis direction is disposed at a position rotated by 90° around the rotational axis 101 with respect to the displacement sensor 67 for the Y-axis direction. Thus, the spindle device according to the embodiment includes a plurality of sensors for detecting displacement when the spindle 1 moves with respect to the housing.

The displacement sensor 66 for detecting displacement in the Z-axis direction can detect, when the bearing cases 14 and 15 have been moved by the hydraulic device 8, whether the bearing cases have moved by desired amounts. In addition, the moving amounts pz of the bearing cases 14 and 15 can be corrected based on an output from the displacement sensor 66. When the output from the displacement sensor 66 deviates from a predetermined range during processing of the workpiece, it is judged that abnormality of the support rigidity of the spindle 1 occurs. In this case, control for stopping the processing of the workpiece can be carried out. Further, for example, control for displaying an alarm on an operation panel can be carried out.

In addition, on the basis of an output from the displacement sensor 67 for detecting displacement in the Y-axis direction and an output from the displacement sensor for detecting displacement in the X-axis direction, displacement or a vibration state of the spindle 1 during the processing of the workpiece can be detected. For example, when amplitude of vibration deviated from a permissible range in the X-axis direction or the Y-axis direction is detected during the processing of the workpiece, control for stopping the processing can be carried out. In addition, an alarm for notifying abnormality can be displayed on the operation panel.

By providing the displacement sensor for detecting the displacement of the spindle with respect to the housing in this manner, abnormality of the moving device can be quickly detected, and continuance of the processing in the lowered state of the processing accuracy can be avoided.

In the bearing case 14 according to the embodiment, the end of the side on which the tool is disposed is supported by the rigidity switching device. In the bearing case 14, the end of the side opposite to the side on which the tool is disposed is supported by the diaphragm 31. By employing this configuration, when the support rigidity is low, the spindle 1 can be effectively vibrated. In addition, by a support using the diaphragm 31, slight movement can be permitted in the direction of the rotational axis 101 of the bearing case 14 while supporting the bearing case 14 with high support rigidity in the diameter direction.

The diaphragm 31 is preferably disposed with a predetermined distance from the tapered part 14a. This predetermined distance enables the spindle 1 to be supported at two positions separate from each other in the axial direction. The spindle 1 can be supported more reliably with high support rigidity. In order to effectively vibrate the spindle, the diaphragm 31 is preferably disposed at a position separate from the friction member 65.

Referring to FIG. 3, when the tool having the small diameter is used or the like, the spindle 1 is moved by a moving amount pz in the Z-axis direction to carry out processing. Accordingly, a processing error of the moving amount pz may occur on the processed surface of the workpiece. Next, control carried out by the machine tool for correcting the processing error of the moving amount pz during the processing of the workpiece will be described.

Figure 6:
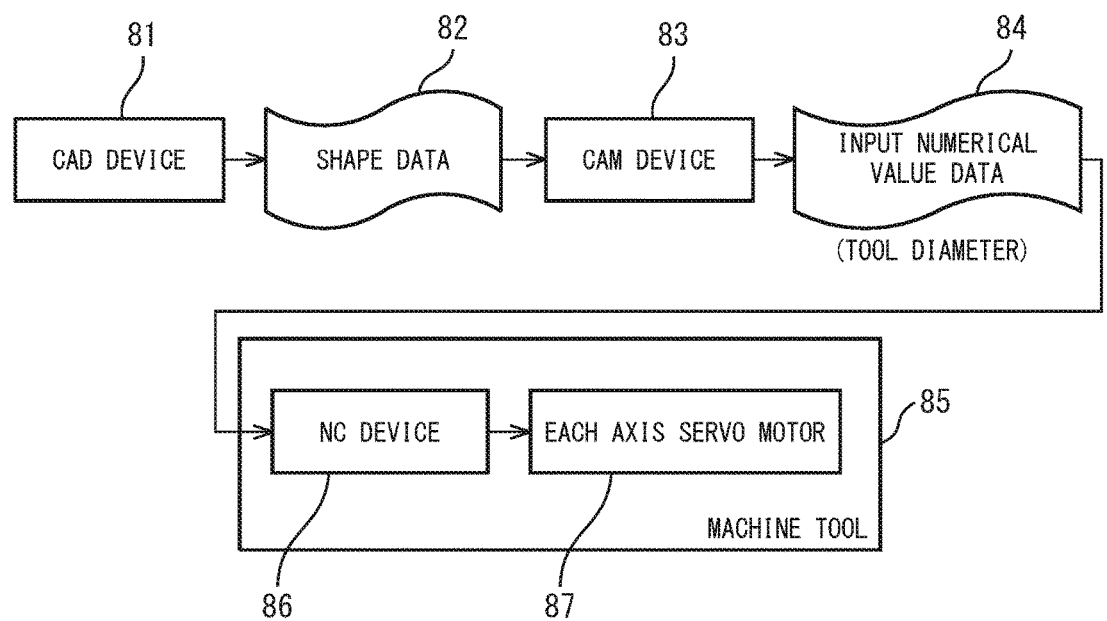
FIG. 6 is a schematic diagram illustrating a machine tool, a CAD device, and a CAM device according to the embodiment.

FIG. 6 is a schematic diagram illustrating a workpiece processing system according to the embodiment. The processing system according to the embodiment includes a machine tool 85 of a numerical control type, and a device for generating input numerical data 84 which is input to the machine tool 85. A shape of the workpiece is designed by a CAD (computer aided design) device 81. The CAD device 81 supplies workpiece shape data 82 to a CAM (computer aided manufacturing) device 83.

The machine tool 85 includes a control device for controlling processing, movement of the workpiece, or the like. The control device according to the embodiment includes a NC (Numerical Control) device 86. The CAM device 83 generates input numerical data 84 which is input to the NC device 86 based on the shape data 82. The input numerical data 84 includes, for example, data indicating a path of a tool tip point when a predetermined tool 2 is used. The input numerical data 84 includes, for example, coordinate values of X, Y and Z axes.

The NC device 86 of the machine tool 85 drives each axis servo motor 87 based on the input numerical data 84. Each axis servo motor 87 includes an X-axis servo motor, a Y-axis servo motor, a Z-axis servo motor or the like. Accordingly, the tool 2 can be moved relatively to the workpiece.

The input numerical data 84 which is input to the NC device 86 includes a tool diameter. The NC device 86 according to the embodiment determines whether the tool diameter of the tool 2 is less than a predetermined value. When the tool diameter of the used tool 2 is less than the predetermined value, the NC device 86 performs control for supporting the bearing cases 14 and 15 with low rigidity. In other words, when the diameter of the tool 2 fixed to the spindle 1 is less than the predetermined value, the rigidity switching device performs control for moving the bearing cases 14 and 15 to the front side.

On the other hand, when the diameter of the used tool is not small, the NC device 86 performs control for supporting the bearing cases 14 and 15 with high rigidity. In other words, when the diameter of the tool 2 fixed to the spindle 1 is equal to or more than the predetermined value, the rigidity switching device performs control for moving the bearing cases 14 and 15 to the rear side.

Thus, the machine tool according to the embodiment can improve processing accuracy by changing the support rigidity for supporting the spindle according to the tool to be fitted.

When the machine tool includes an automatic tool exchanging device for automatically replacing a tool, fitting of a tool having a tool diameter smaller than the predetermined value is detected, and the rigidity switching device can be controlled so as to support the spindle with low support rigidity. Fitting of a tool having a tool diameter equal to or larger than the predetermined value is detected, and the rigidity switching device can be controlled so as to support the spindle with high support rigidity. When the tool is automatically replaced, as illustrated in FIG. 1, driving of the hydraulic cylinder 5 by the control device enables the tool holder 3 to which the tool 2 is fixed to be detached from or attached to the spindle 1.

When the spindle 1 is supported with low support rigidity, the NC device 86 can perform control for offsetting a Z-axis tool-length of the tool 2 by a value corresponding to the moving amount pz of the bearing case 14. This control enables correction of a processing error generated in the Z-axis direction when the spindle is supported with low support rigidity. The NC device 86 can drive each axis servo motor 87 on the corrected tool path.

The example of offsetting the tool in the NC device 86 of the machine tool 85 has been described in the above description. However, it is not limited to the above-described embodiment. For example, when a tool path is generated by the CAM device 83, in the case of a tool having a small diameter, a tool length may be corrected in advance or a tool path may be offset.

The aforementioned rigidity switching device makes the tapered part 14*a* of the bearing case 14 to closely attach to the tapered hole part 11*a* of the front housing 11. However, the rigidity switching device is not limited to this as long as the bearing case is supported by moving the bearing case to press the tapered part to the housing. Further, the rigidity switching device is not limited to the manner of contacting or separating the tapered part of the bearing case with or from the front housing, but can switch the support rigidity by any configuration.

Figure 7:
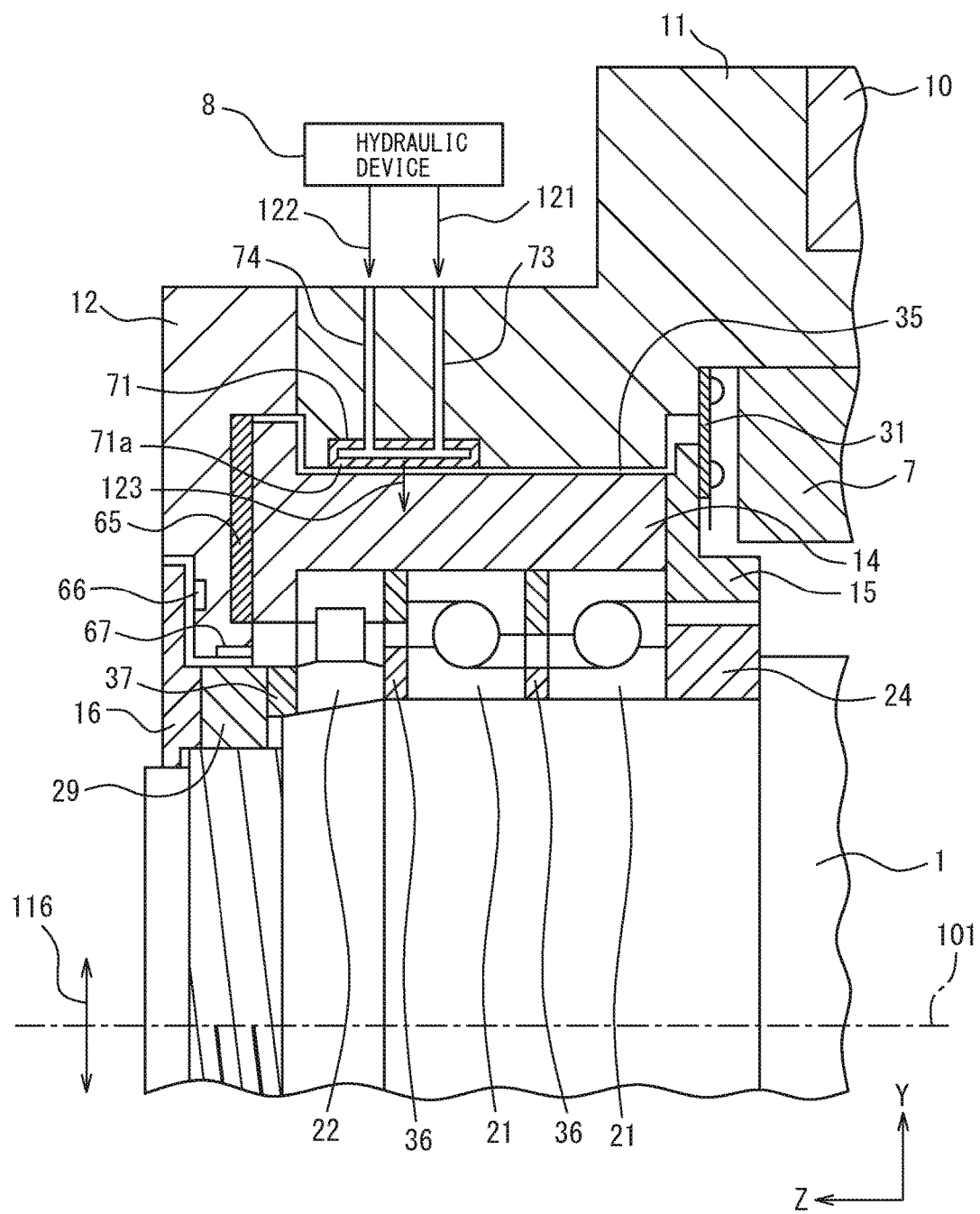
FIG. 7 is a schematic enlarged sectional view of a bearing case portion of another spindle device according to the embodiment.

FIG. 7 is a schematic enlarged sectional view of portions of a front bearing and a bearing case of another spindle device according to the embodiment. FIG. 7 illustrates a state where a spindle 1 is supported with low rigidity by using a tool having a small diameter. A rigidity switching device of the other spindle device includes a hydraulic chamber member 71. The hydraulic chamber member 71 is hollow inside, forming a hydraulic chamber. The hydraulic chamber member 71 is disposed in a region of an inner surface of a front housing 11 opposite to a bearing case 14. The hydraulic chamber member 71 is formed, for example, so that the hydraulic chamber can extend along a rotational axis 101.

A slight gap is formed between an outer surface of the bearing case 14 and the inner surface of the front housing 11. Height of the gap part 35 is, for example, about several tens of μm. An end surface of a front side of the bearing case 14 is in contact with a friction member 65 by an elastic force of a diaphragm 31. When processing is carried out by using a tool having a small diameter, as in the case of the aforementioned spindle device, the spindle 1 is vibrated. In this case, the end surface of the front side of the bearing case 14 slides with the friction member 65 to enable vibration to be damped by friction.

The hydraulic chamber member 71 includes a thin part 71*a* opposite to the bearing case 14. The thin part 71*a* is formed to be elastically deformed toward the bearing case 14 as indicated by an arrow 123 when high hydraulic pressure is supplied from a hydraulic device 8. The thin part 71*a* can be made of metal such as spring steel.

When a usual tool or a tool having a large diameter is used, the hydraulic device 8 supplies high-pressure control oil into the hydraulic chamber member 71 through oil paths 73 and 74 as indicated by arrows 121 and 122. Swelling of the thin part 71*a* enables the bearing case 14 to be pressed to the inside in a radial direction. As a result, the bearing case 14 can be supported with high rigidity. Accordingly, the spindle 1 can be supported with high support rigidity.

On the other hand, when a tool having a small diameter is used or the like, hydraulic pressure in the hydraulic chamber member 71 is reduced. Through this control, the thin part 71*a* is separated from the bearing case 14 to enable unbinding of the bearing case 14. Actions and effects similar to those described above can be provided by such a rigidity switching device.

In addition, in the other spindle device illustrated in FIG. 7, since the spindle 1 does not move in the direction of the rotational axis 101, it is not necessary to perform control for offsetting the tool length of the tool 2 by the predetermined moving amount, as the aforementioned case. Thus, control of each axis servo motor can be simplified.

In the spindle device according to the embodiment, the front bearing includes two angular bearings 21 and one roller bearing 22. However, it is not limited to the above-described embodiment, and the front bearing can employ any type of a bearing. Any number of bearings can also be employed. For example, the front bearing may include a roller bearing without using any angular bearing. For a rear bearing, similarly, the spindle can be supported by any configuration.

The rigidity switching means according to the embodiment is formed to switch the support rigidity for supporting the spindle at two stages. However, it is not limited to the above-described embodiment, and the rigidity switching means may be formed to switch the support rigidity at three stages or more. For example, in the embodiment illustrated in FIG. 7, the hydraulic pressure supplied to the hydraulic chamber member 71 from the hydraulic device 8 may be switched at three stages or more.

In the aforementioned embodiment, it is determined whether the used tool having the diameter smaller than the predetermined value or the tool having the diameter equal to or larger than the predetermined value so as to switch the rigidity. However, an operator of the machine tool may designate a number of an easily vibrated tool in advance without determination based on a tool diameter, and when the NC device 86 determines that the tool with the number is fitted to the spindle by a tool replacing operation, high rigidity may be switched to low rigidity.

The vibration damping device according to the embodiment is formed so that the friction member 65 and the end surface of the front side of the bearing case 14 can slide with each other. However, it is not limited to the above-described embodiment, and the vibration damping device may be formed to accelerate damping of the vibration generated in the spindle 1. For example, the vibration damping device may include, when the bearing cases 14 and 15 are supported with low rigidity, an elastic member which protrudes from the inside of the housing toward the bearing cases 14 and 15. This elastic member can be made of an elastic material such as rubber. The elastic member is housed in the housing in the case of high rigidity, and protrudes from the housing in the diameter direction in the case of low rigidity to be able to press the bearing case. Pressing the bearing case by the elastic member enables the vibration of the bearing case and the spindle to be damped.

The aforementioned embodiments can be combined in any appropriate way. Throughout the drawings described above, the same or equivalent portions are demoted by the same reference signs. The aforementioned embodiments are only exemplary, not limitative of the present invention. The embodiments include changes which are within the scope of claims.

REFERENCE SIGNS LIST 1 spindle
2 tool
8 hydraulic device
10 spindle head housing
11 front housing
12 front end housing
14, 15 bearing case
17 bearing case
21 angular bearing
22 roller bearing
31 diaphragm
35 gap part
63, 64 oil chamber
65 friction member
66, 67 displacement sensor
71 hydraulic chamber member
71a thin part
84 input numerical data
85 machine tool
86 NC device
87 each axis servo motor

The invention claimed is:
1. A spindle device of a machine tool, comprising:
a spindle to which a tool is fitted;
a bearing for rotatably supporting the spindle;
a bearing case for holding the bearing;
a housing in which the spindle, the bearing, and the bearing case are arranged;
a rigidity switching device supporting the bearing case on the housing and capable of switching support rigidity for supporting the bearing case at a plurality of stages of rigidity including low rigidity and high rigidity higher than the low rigidity; and
a vibration damping device disposed between the housing and the bearing case and actuated when the rigidity switching device supports the bearing case with the low rigidity, wherein
the vibration damping device includes a friction member disposed in a contact part of the housing and the bearing case,
the rigidity switching device is formed to move the bearing case along a rotational axis of the spindle in the housing,
the bearing case includes a tapered part in which a diameter of an outer surface is gradually reduced, and
the rigidity switching device supports the bearing case with the high rigidity by moving the bearing case to press the tapered part to the housing, and supports the bearing case with the low rigidity by providing the tapered part with a gap.

2. The spindle device of the machine tool according to claim 1, further comprising a plate-like member supporting the bearing case on the housing and having a thickness direction set nearly parallel to a rotational axis of the spindle, wherein
the bearing case has an end of a side on which the tool is disposed and which is supported by the rigidity switching device, and an end of a side opposite to the side on which the tool is disposed and which is supported by the plate-like member.

3. The spindle device of the machine tool according to claim 1, further comprising a displacement sensor for detecting displacement of the spindle with respect to the housing.

4. The spindle device of the machine tool according to claim 1, wherein the rigidity switching device normally supports the bearing case with the high rigidity, and is switched to support the bearing case with the low rigidity when a predesignated tool is fitted to the spindle.

5. The spindle device of the machine tool according to claim 1, wherein the rigidity switching device supports the bearing case with the low rigidity when a diameter of the tool fitted to the spindle is smaller than a preset value, and supports the bearing case with the high rigidity when the diameter of the tool fitted to the spindle is equal to or larger than the preset value.

6. A machine tool comprising:
the spindle device according to claim 1,
wherein when the rigidity switching device switches the support rigidity of the bearing case to the low rigidity, a tool length offset value of a NC device is rewritten only by a value equivalent to a moving amount of the bearing case along the rotational axis of the spindle.

* * * * *